(12) United States Patent
Schneider et al.

(10) Patent No.: US 8,521,366 B2
(45) Date of Patent: Aug. 27, 2013

(54) METHOD FOR ASSISTED PARKING IN A PARKING SPACE, AND DEVICE FOR THAT PURPOSE

(75) Inventors: Marcus Schneider, Ludwigsburg (DE); Mirza Alikadic, Nehren (DE); Michael Schoenherr, Renningen-Malmsheim (DE); Christian Hoffmann, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/388,402

(22) PCT Filed: Aug. 3, 2010

(86) PCT No.: PCT/EP2010/061316
§ 371 (c)(1),
(2), (4) Date: Apr. 18, 2012

(87) PCT Pub. No.: WO2011/015592
PCT Pub. Date: Feb. 10, 2011

(65) Prior Publication Data
US 2012/0197492 A1 Aug. 2, 2012

(30) Foreign Application Priority Data

Aug. 5, 2009 (DE) .......................... 10 2009 028 251

(51) Int. Cl.
*A01B 69/00* (2006.01)
(52) U.S. Cl.
USPC ......................................... 701/41; 340/932.2
(58) Field of Classification Search
USPC .................... 701/31.4, 41, 42, 301; 340/435, 340/932.2
See application file for complete search history.

(56) References Cited

U.S. PATENT DOCUMENTS

| | | | |
|---|---|---|---|
| 7,012,550 B2 * | 3/2006 | Iwakiri et al. | 340/932.2 |
| 2004/0249564 A1 * | 12/2004 | Iwakiri et al. | 701/200 |
| 2010/0066515 A1 * | 3/2010 | Shimazaki et al. | 340/435 |
| 2011/0054739 A1 * | 3/2011 | Bammert et al. | 701/41 |
| 2012/0092191 A1 * | 4/2012 | Stefik et al. | 340/932.2 |

FOREIGN PATENT DOCUMENTS

| | | |
|---|---|---|
| DE | 10 2006 052 575 | 5/2008 |
| DE | 10 2007 027 438 | 12/2008 |
| JP | 63-191987 | 8/1988 |
| JP | 2003-252150 | 9/2003 |
| JP | 2008-284969 | 11/2008 |

OTHER PUBLICATIONS

International Search Report for PCT/EP2010/061316, dated Nov. 17, 2010.
Universelle Bahnplanung Fuer Das Automatische Einparken, ATZ Automobiltechnische Zeitschrift, Vieweg Publishing, Wiesbaden, DE, vol. 109, No. 1, Jan. 1, 2007, pp. 66-71, XP001540634.

* cited by examiner

*Primary Examiner* — Helal A Algahaim
(74) *Attorney, Agent, or Firm* — Kenyon & Kenyon LLP

(57) ABSTRACT

In a method for assisted parking of a vehicle in a parking space with the aid of a parking-assistance device which guides the vehicle along parking trajectory, the vehicle is guided along a first segment of the parking trajectory up to an intermediate point which is determined in such a way that it is possible to pull the vehicle into either a parallel or a diagonal parking space, and it is identified whether the parking space is a parallel or a diagonal parking space. The vehicle is guided along a second segment of the parking trajectory which is selected depending upon whether the parking space is a parallel or a diagonal parking space.

5 Claims, 2 Drawing Sheets

Fig. 1a
Fig. 1b
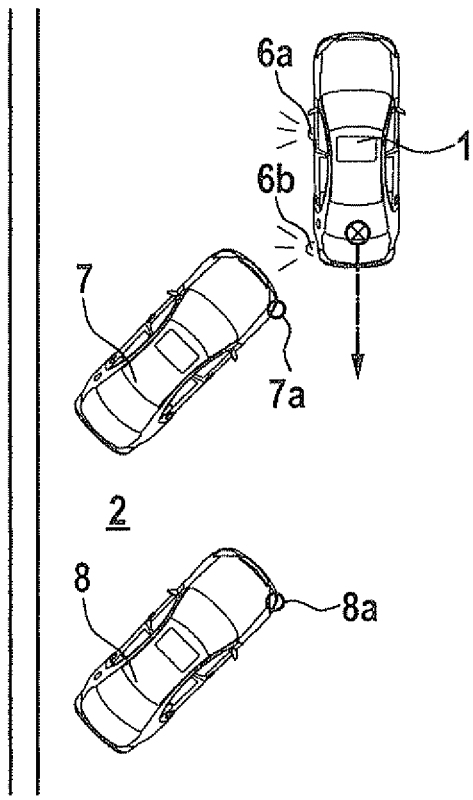
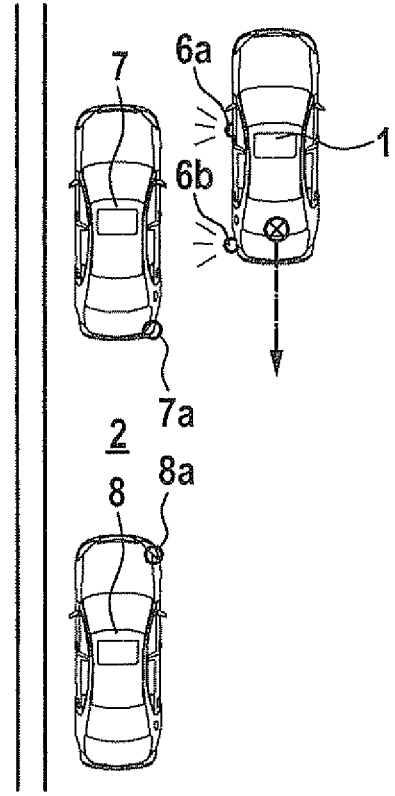

METHOD FOR ASSISTED PARKING IN A PARKING SPACE, AND DEVICE FOR THAT PURPOSE

BACKGROUND OF THE INVENTION

1. Field of the Invention

The present invention relates to a method for the assisted parking of a vehicle in a parking space with the aid of a parking-assistance device that guides the vehicle along at least one parking trajectory.

2. Description of Related Art

So-called semiautomatic parking with the aid of a parking-assistance device makes it possible to guide a vehicle into a parking space, in doing which, either a steering movement may be specified by the parking-assistance device to the driver, or the parking-assistance device may actively steer the vehicle, and the driver only has to operate the gas pedal and brake pedal. The parking space in which the vehicle is to be parked may be a parallel parking space, so that in the final parked position, the vehicle is aligned parallel to the roadway on which the vehicle drives up to the parking space. If the parking space is a diagonal parking space, then in the final parked position, the vehicle is parked diagonally relative to the roadway, so that, for example, the vehicle is at an angle of approximately 45° relative to the roadway. Depending upon whether the parking space is a parallel parking space or a diagonal parking space, the objects which border the parking space are for the most part also aligned parallel to, or diagonally relative to the roadway. As a rule, the objects involve further vehicles, so that the vehicle itself must be parked so that it is offset in parallel, or is between the vehicles already parked next to one another.

Using detecting means, e.g., ultrasonic sensors, disposed laterally on the vehicle, the parking-assistance device, while the vehicle is moving slowly forward, surveys the objects which border the parking space. Based on the signal pattern ascertained, which is transmitted by the detecting means to the parking-assistance device, it is detected whether and where a suitable parking space is available relative to the vehicle. If the vehicle is pulled into a parking space which was detected by the detecting means, this may be accomplished by a move in reverse, and the parking-assistance device takes over the steering process, while the driver then only has to operate the brake and the accelerator. The parking-assistance device intervenes in the steering system of the vehicle in such a way that the vehicle to be parked is both steered past the objects bordering the parking space, and at the end of the parking maneuver, the vehicle is standing in a parallel parking space parallel to the boundary of the roadway, as a rule, the curb. In a further possible variant, the driver himself must still steer, however, the parking-assistance system communicates to the driver, what steering operation the driver must perform. In each case, however, the parking-assistance device specifies a steering motion which is either carried out semi-automatically, or is assumed by the driver.

According to a further development stage of parking-assistance devices, it is possible to park in perpendicular parking spaces, so that at the end of the parking process, the vehicle is oriented perpendicularly to the curb of the roadway. The parking-space position may be ascertained by detecting means such as ultrasonic sensors, provided laterally on the vehicle, in these systems, as well. For example, the decision as to whether a parking space is oriented in a direction parallel to or perpendicular to the roadway may be accomplished by an input by the driver, in which the driver actuates a select button in order to provide the parking-assistance device with the information as to whether the vehicle should be parked perpendicular to, or parallel to the roadway.

In the event of an operating error, for example, if the driver accidentally initiates a parallel parking operation in the case of a perpendicular parking situation really existing, with several free parking places side-by-side, the result is merely an unwanted parking alignment of the vehicle, but no collision with objects bordering the parking space is to be expected.

However, the problem of a collision arises if the choice must be made between a parallel parking space and a diagonal parking space. Diagonal parking spaces can only be distinguished from perpendicular parking spaces to a very limited extent by the detecting means as the vehicle passes the diagonal parking spaces, which is why the driver is integrated into the decision process. If the driver makes an error in selecting the type of parking space, and mistakenly selects a parallel parking space instead of a diagonal parking space, then with high probability, the vehicle will collide with an object bordering the parking space, as a rule, with a further vehicle.

A method for the assisted parking of a vehicle in a parking space with the aid of a parking-assistance device is already known from the German Patent application 10 2007 027 438 A1. In that case, detecting means are used which communicate the distances to the objects bordering the parking space in the form of data records to the parking-assistance device. A steering motion may be initiated or specified on the basis of these data records. As a result, therefore, a vehicle is able to be pulled exactly into a perpendicular parking space.

Published German patent application document DE 10 2006 052 575 A1 describes a further method for the assisted parking of a vehicle in a perpendicular parking space with the aid of a parking-assistance device, in doing which, the parking process may be assisted automatically with the fewest possible operating actions by the driver, even if, for instance, the parking space is not adequately ascertainable with respect to the depth measured relative to the direction of travel of a roadway. In this context, an automatic parking mode may also be activated directly without an input by the driver to actuate a parking process, providing the obstacles and/or open spaces sensed by a detecting means in a parking space have been ascertained reliably. An angle between a longitudinal direction of the vehicle and a front end of the parking space represents one criterion which may be utilized to determine whether parallel parking or perpendicular parking is desired on the part of the driver. If the driver stops the vehicle at an angle of the longitudinal axis relative to the front of the parking space which exceeds what is referred to as a triggering angle, it may then be assumed that the driver intends to park perpendicularly. It is further proposed that the driver confirmation input is only provided if an angle between the longitudinal direction of the vehicle and a front of the parking space exceeds a predefined triggering angle.

However, the known methods are unable to overcome the danger that a collision may occur with the objects bordering the parking space due to a false input by the driver to the parking-assistance device when selecting between a parallel parking space and a diagonal parking space.

Therefore, an object of the present invention is to provide a method for the assisted parking of a vehicle in a parking space with the aid of a parking-assistance device which overcomes the disadvantages of the related art cited above, and permits collision-free parking in a parking space which may be in the form of a parallel parking space or a diagonal parking space.

BRIEF SUMMARY OF THE INVENTION

The invention includes the technical teaching that the method contains at least the steps of: Guiding the vehicle along a first segment of the parking trajectory up to an intermediate point, the intermediate point being determined in such a way that it is possible to subsequently pull the vehicle into the parking space, which is a parallel parking space or a diagonal parking space; Identifying the parking space as a parallel parking space or as a diagonal parking space, and; Guiding the vehicle along a second segment of the parking trajectory which follows the first segment and which is selected in such a way that the vehicle is guided depending upon whether the parking space is a parallel parking space or a diagonal parking space.

The essence of the invention is the splitting of the parking trajectory into a first segment and a second segment. The first segment of the parking trajectory up to the intermediate point is determined in such a way that a continuance of the parking process both into a parking space oriented diagonally relative to the roadway or into a parking space aligned parallel to the roadway is possible. When the intermediate point is reached, the parking space is identified as a parallel parking space or as a diagonal parking space. If a parallel parking space is identified, the vehicle is then guided along the second segment of the parking trajectory in such a way that the vehicle is parked parallel to the roadway. If a diagonal parking space is identified, the second segment is then selected so that the vehicle is parked in a parking position oriented diagonally relative to the roadway. In this context, the second segment of the parking trajectory is made dependent in particular upon the alignment of the objects which border the parking space. Preferably, the parking space is identified as a parallel parking space or as a diagonal parking space based on the detection of the objects bordering the parking space. As a general principle, the method described follows a previous detection of the parking space by the parking-assistance device, and the parking of the vehicle is accomplished preferably with a move in reverse along the two-part parking trajectory, but may also be carried out with a move forward.

In order to identify the parking space as a parallel parking space or as a diagonal parking space, a detecting means is provided which, in the step of identifying the parking space, transmits the information concerning the type of parking space to the parking-assistance device. The detecting means may be mounted on the vehicle as ultrasonic sensors or as radar sensors by which the parking space is detectable and measurable. The detecting means may be used both for the basic detection of the parking space, e.g., when the vehicle is guided slowly past the parking space, the detecting means detecting the parking space by the presence of the objects bordering the parking space. After reaching the intermediate point, the detecting means may also be used to identify what type of parking space it is.

The parking space may be bounded by objects which preferably are further parked vehicles. The parking space is identified as a parallel parking space or a diagonal parking space by detecting at least one of the objects with the aid of the detecting means.

The objects bordering the parking space may be vehicles which are parked diagonally relative to the roadway if the parking space is a diagonal parking space, and the vehicles being parked one behind the other parallel to the roadway if the parking space is a parallel parking space. Consequently, parallel parking space means that the vehicles are parked parallel to the roadway, a diagonal parking space being defined by vehicles which are parked at an angle, preferably of 45°, relative to the roadway.

The detecting means are able to determine a distance between the vehicle and at least one of the objects, two detecting means preferably being provided in the form of ultrasonic sensors on each side of the vehicle. The first segment of the parking trajectory is determined up to the intermediate point in such a way that the vehicle has an alignment in which the vehicle is positioned approximately parallel to a vehicle if this vehicle is oriented diagonally relative to the roadway on which the vehicle approaches the parking space. Consequently, the vehicle is turned to some extent into the parking space, diagonally relative to the boundary of the roadway, until the intermediate point is reached, If the parking space is a parallel parking space, the vehicle is then at a diagonal angle with respect to the vehicles which border the parallel parking space in the front and in the back.

An essentially constant distance is detected by the detecting means over the second segment of the parking trajectory when the parking space is a diagonal parking space, so that the second segment is carried out essentially as straight backing-up. If the first segment of the parking trajectory is a curved segment, in the case of a diagonal parking space, the vehicle then stands parallel to the adjacent vehicle. If the second part of the parking trajectory is now carried out, the vehicle merely travels with a backing-up parking movement parallel to the adjacent vehicle. Consequently, the distance between the vehicle and the adjacent vehicle detected by the detecting means no longer changes.

If the detecting means detects a distance that is becoming greater over the second segment of the parking trajectory, then if the parking space is a parallel parking space, the second segment is carried out essentially as a trajectory curve. This trajectory curve has an opposite curvature relative to the trajectory curve which pertains to the first segment of the parking trajectory. In this context, the distance may be measured both prior to reaching the intermediate point, and after reaching the intermediate point. Since in known manner, the vehicles bordering the parking space generally have a rectangular basic cross-section, the distance between the vehicle pulling in and the adjacent vehicle will be minimal when the detecting means detects a corner of the vehicle, the distance increasing again when the detecting means is guided past the corner of the vehicle. Therefore, a parallel parking space is able to be identified. If the adjacent vehicle is standing diagonally relative to the roadway, the distance between the moving vehicle and the vehicle bordering the parking space remains essentially constant over the entire second segment of the parking trajectory.

The present invention is further directed to a parking-assistance device for the assisted parking of a vehicle in a parking space along at least one parking trajectory, the parking trajectory being split into a first segment and a second segment, an intermediate point being provided between the segments, and an alignment of the vehicle being determined at the intermediate point in such a way that subsequent parking is permitted in a parking space in the form of a parallel parking space or a diagonal parking space, identification of the parking space being made possible in such a way that the parking space is identified as a parallel parking space or as a diagonal parking space. In addition, a detecting means is provided, by which the identification as a parallel parking space or as a diagonal parking space is accomplished.

BRIEF DESCRIPTION OF THE DRAWINGS

FIG. 1a shows a situation of pulling a vehicle into a parking space in the form of a diagonal parking space.

FIG. 1b shows a situation of pulling a vehicle into a parking space in the form of a parallel parking space.

DETAILED DESCRIPTION OF THE INVENTION

Figure 2A:
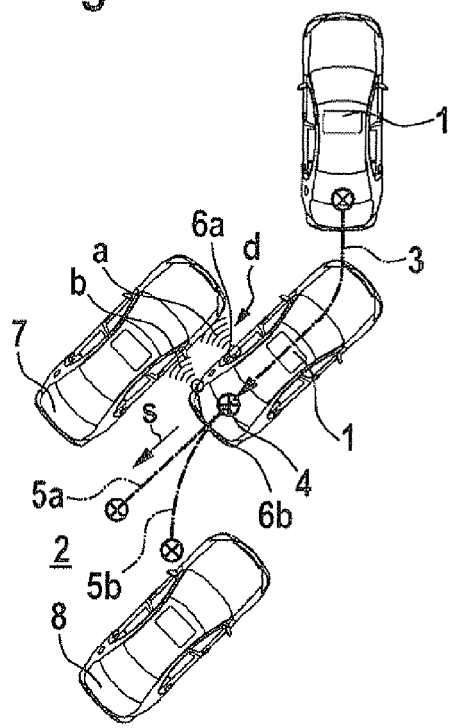
FIG. 2a shows an exemplary embodiment of a parking trajectory for pulling a vehicle into a diagonal parking space, the vehicle being depicted both at the starting point and at an intermediate point, and a second segment of the parking trajectory into the diagonal parking space following after the intermediate point.

FIGS. 1a and 1b show an exemplary embodiment of a situation of parking a vehicle 1 in a parking space 2. Parking space 2 is bounded by a first object 7 in the form of a first vehicle 7 and by a second object 8 in the form of a second vehicle 8. Vehicles 7 and 8 are standing diagonally relative to the roadway, so that parking space 2 is a diagonal parking space. Vehicle 1 is moved slowly past parking space 2, counter to the arrow direction shown. Provided on vehicle 1 are detecting means 6a and 6b, which are implemented as ultrasonic sensors and which detect parking space 2. To detect parking space 2, vehicle 1 is moved slowly past vehicles 7 and 8, so that detecting means 6a and 6b detect a first marking point 7a on first vehicle 7 and a second marking point 8a on vehicle 8. The relatively imprecise profile detected by detecting means 6a and 6b and used to identify a parking space 2 does not make it possible to determine the parking space as a diagonal parking space or a parallel parking space. Therefore, only the information that a parking space is available is provided to the driver, and the vehicle may be moved back again into the starting position counter to the arrow direction shown.

Figure 2B:
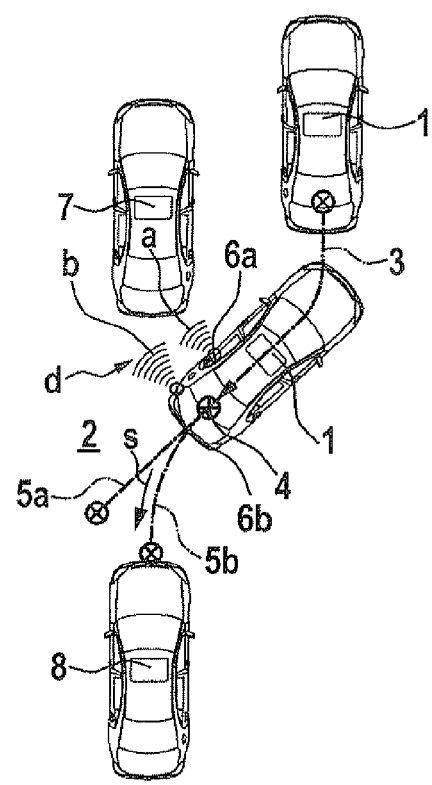
FIG. 2b shows an exemplary embodiment of a parking trajectory for pulling a vehicle into a parallel parking space, the vehicle being depicted both at the starting point and at an intermediate point, and a second segment of the parking trajectory into the parallel parking space following after the intermediate point.

FIGS. 2a and 2b show vehicle 1 both in the starting situation according to FIGS. 1a and 1b, and in the position at an intermediate point 4 after traveling through a first segment 3 of the parking trajectory. The parking trajectory describes a trajectory curve, which is suitable both for pulling vehicle 1 into a diagonal parking space according to FIG. 2a and into a parallel parking space according to FIG. 2b. While vehicle 1 is moved along first segment 3 of the parking trajectory up to intermediate point 4, detecting means 6a and 6b determine a distance d which, according to the present exemplary embodiment, is measured between parking vehicle 1 and vehicle 7.

In FIG. 2a, parking space 2 is a diagonal parking space, so that vehicles 7 and 8 are aligned diagonally relative to the roadway on which vehicle 1 approaches parking space 2. Vehicle 1 is shown both in the starting position and at intermediate point 4, both a first distance position a and a second distance position b with respect to vehicle 7 again being measured by detecting means 6a and 6b. Distances d between detecting means 6a and 6b and first distance position a and second distance position b are equal, so that parking space 2 is identified by detecting means 6a and 6b as a diagonal parking space. Consequently, the parking-assistance device determines second segment 5a of the parking trajectory as straight backing-up. Vehicle 1 is moved parallel to parked vehicle 7 and parked vehicle 8 along second segment 5a, so that distance d does not further change.

FIG. 2b shows parking space 2 as a parallel parking space. Consequently, vehicles 7 and 8 are standing parallel to the roadway on which vehicle 1 approaches parking space 2. A distance d is measured between vehicle 1 and vehicle 7. Detecting means 6a and 6b measure a distance both in a first distance position a and in a second distance position b, which turns out to be of different size. If vehicle 1 is in a position in which detecting means 6b measures distance d to first distance position a, distance d is relatively small. If the vehicle is moved further in the direction toward intermediate point 4, distance d between detecting means 6a and second distance position b at vehicle 7 increases again. Therefore, a parallel parking space is able to be identified, and vehicle 1 is pulled into parking space 2 along second segment 5b up to the final parked position.

Figure 3A:
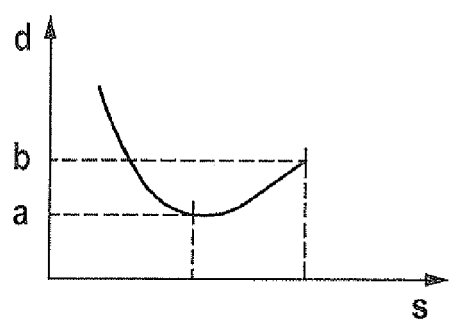
FIG. 3a shows a diagram of a distance d between the parking vehicle and an adjacent vehicle over a parking path s, as results when the parking space is a parallel parking space.
Figure 3B:
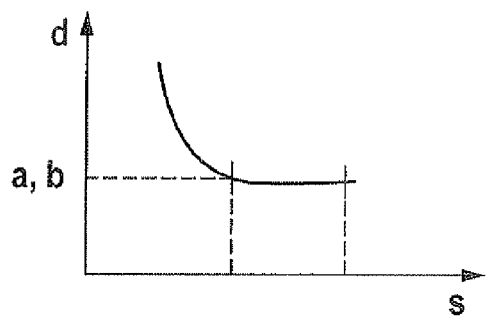
FIG. 3b shows a diagram of a distance d between the parking vehicle and an adjacent vehicle over a parking path s, as results when the parking space is a diagonal parking space.

FIGS. 3a and 3b show in a diagram the characteristic of distance d over path s, which the vehicle measures over first segment 3 and second segment 5a and 5b of the parking trajectory. Both first distance position a and second distance position b between detecting means 6a and 6b and vehicle 7 are represented on the ordinate of distance d. FIG. 3a shows the characteristic of distance d when pulling into a parallel parking space, so that the distance initially becomes smaller when detecting means 6a and 6b approach the vehicle corner, which is denoted by first distance position a. If the vehicle pulls further into the parking space, the distance increases again, so that distance d is greater in second distance position b than in first distance position a.

FIG. 3b shows distance d over a diagonal parking space, so that the distance between detecting means 6a and 6b and vehicle 7 no longer changes. Consequently, distance d in first distance position a is exactly the same as in second distance position b.

The present invention is not limited in its implementation to the preferred exemplary embodiment indicated above. Rather, a number of variants are conceivable which make use of the design approach presented, even in the case of fundamentally different implementations. All features and/or advantages, including structural particulars, spatial arrangements and method steps, derived from the claims, the description or the drawing can be essential to the invention, both alone and in greatly differing combinations.

What is claimed is:

1. A method for automated assisted parking of a controlled vehicle into a parking space with the aid of a parking-assistance device which guides the vehicle along at least one parking trajectory, the method comprising:
    guiding the vehicle along a first segment of the parking trajectory up to an intermediate point which is determined in such a way that the vehicle is subsequently able to be guided into the parking space from the intermediate point irrespective of whether the parking space is a parallel parking space or a diagonal parking space;
    subsequently identifying the parking space as one of a parallel parking space or a diagonal parking space;
    guiding the vehicle along a second segment of the parking trajectory following the first segment, wherein the second segment of the parking trajectory is selected depending upon whether the identified parking space is a parallel parking space or a diagonal parking space;
    wherein the controlled vehicle has at least one detecting unit which identifies whether the parking space is a parallel parking space or a diagonal parking space;
    wherein the parking space is bounded by objects, and wherein the parking space is identified as one of a parallel parking space or a diagonal parking space by detecting at least one of the objects bounding the parking space with the aid of the at least one detecting unit;

wherein the detecting unit determines a distance between the controlled vehicle and the at least one detected object; and wherein in the case the detecting unit detects the distance between the controlled vehicle and the at least one detected object remaining essentially constant over the second segment of the parking trajectory, the parking space is identified as a diagonal parking space, and the second segment of the parking trajectory is implemented essentially as straight back-up.

2. The method as recited in claim 1, wherein the at least one object detected by the detecting unit is a further vehicle which is one of (i) aligned parallel to a roadway in the case the parking space is a parallel parking space, or (ii) aligned diagonally relative to the roadway in the case the parking space is a diagonal parking space.

3. The method as recited in claim 1, wherein the first segment of the parking trajectory up to the intermediate point is determined in such a way that the controlled vehicle has an alignment in which the controlled vehicle is positioned approximately parallel to a further vehicle which is oriented diagonally relative to a roadway on which the controlled vehicle approaches the parking space.

4. The method as recited in claim 1, wherein in the case the detecting unit detects the distance between the controlled vehicle and the at least one detected object increasing over the second segment of the parking trajectory, the parking space is identified as a parallel parking space, and the second segment of the parking trajectory is implemented essentially as a trajectory curve.

5. A parking-assistance device for automated assisted parking of a controlled vehicle along at least one parking trajectory into a parking space, comprising:

means for determining a first segment of the parking trajectory up to an intermediate point, wherein the intermediate point is determined in such a way that the vehicle is subsequently able to be guided into the parking space from the intermediate point irrespective of whether the parking space is a parallel parking space or a diagonal parking space;

a detection unit which subsequently identifies the parking space as one of a parallel parking space or a diagonal parking space;

means for determining a second segment of the parking trajectory following the first segment, wherein the second segment of the parking trajectory is determined depending upon whether the identified parking space is a parallel parking space or a diagonal parking space;

wherein the parking space is bounded by objects, and wherein the parking space is identified as one of a parallel parking space or a diagonal parking space by detecting at least one of the objects bounding the parking space with the aid of the detection unit, and wherein the detection unit determines a distance between the controlled vehicle and the at least one detected object; and wherein in the case the detection unit detects the distance between the controlled vehicle and the at least one detected object remaining essentially constant over the second segment of the parking trajectory, the parking space is identified as a diagonal parking space, and the second segment of the parking trajectory is implemented essentially as straight back-up.

\* \* \* \* \*

UNITED STATES PATENT AND TRADEMARK OFFICE
CERTIFICATE OF CORRECTION

PATENT NO. : 8,521,366 B2  Page 1 of 1
APPLICATION NO. : 13/388402
DATED : August 27, 2013
INVENTOR(S) : Schneider et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 18 days.

Signed and Sealed this

Fifteenth Day of September, 2015

Michelle K. Lee
*Director of the United States Patent and Trademark Office*